(12) United States Patent
Yoshimura et al.

(10) Patent No.: US 7,221,068 B2
(45) Date of Patent: May 22, 2007

(54) INSULATED MOTOR CORE AND METHOD FOR PRODUCING SAME

(75) Inventors: Noriyuki Yoshimura, Miyota-Machi (JP); Kesao Suzuki, Miyota-Machi (JP)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 11/113,252

(22) Filed: Apr. 22, 2005

(65) Prior Publication Data

US 2005/0236913 A1   Oct. 27, 2005

(30) Foreign Application Priority Data

Apr. 22, 2004   (JP) .............................. 2004-127445

(51) Int. Cl.
   *H02K 15/12*   (2006.01)
(52) U.S. Cl. ........................................ 310/45; 310/216
(58) Field of Classification Search ................ 310/45, 310/216–218
   See application file for complete search history.

(56) References Cited

U.S. PATENT DOCUMENTS 3,967,045 A * 6/1976 Kurobe et al. .............. 428/463
4,615,106 A * 10/1986 Grimes et al. ................ 29/605
5,663,601 A * 9/1997 Wakabayashi et al. ........ 310/45

FOREIGN PATENT DOCUMENTS

| JP | 58-83559 | 5/1983 |
|---|---|---|
| JP | 58-83561 | 5/1983 |
| JP | 61-205111 | 12/1986 |
| JP | 1-278242 | 11/1989 |
| JP | 6-41788 | 2/1994 |
| JP | 8-265994 | 10/1996 |

\* cited by examiner

*Primary Examiner*—Thanh Lam
(74) *Attorney, Agent, or Firm*—Ostrolenk, Faber, Gerb & Soffen, LLP

(57) ABSTRACT

A motor core coated with a multi-layer insulating film. The insulating film preferably includes in order: an electrodeposited coating film applied upon an outer surface of the motor core; a first spray coated insulating film applied upon an outer surface of the electrodeposited coating film the first film having a pencil hardness of between about 2H and 4H; and a second spray-coated insulating film applied upon an outer surface of the first spray-coated insulating film, the second film having a pencil hardness of between about 3H and 6H. The invention is additionally directed to a variety of methods for forming such insulation-coated cores.

23 Claims, 5 Drawing Sheets

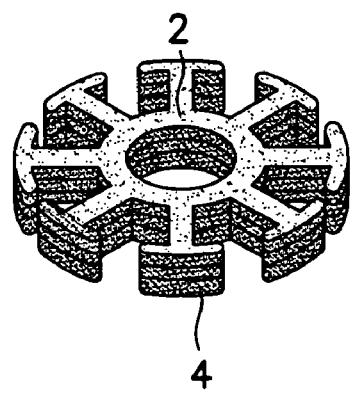
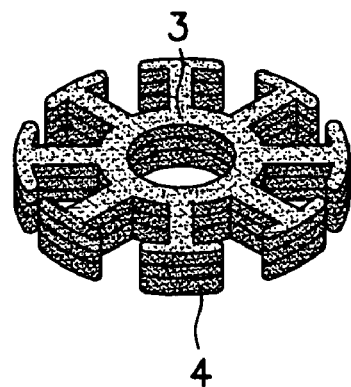
Figure 3A    Figure 3B
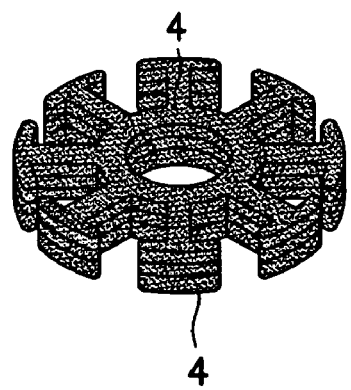
Figure 3C
Figure 4

INSULATED MOTOR CORE AND METHOD FOR PRODUCING SAME

CROSS REFERENCE TO RELATED APPLICATION

The present application claims benefit of Japanese Application No. 2004-127445 filed Apr. 22, 2005.

BACKGROUND OF THE INVENTION

1. Field of the Invention

The present invention relates to an insulated motor core. More specifically, it relates to a motor core coated with a multi-layer insulating film and to methods for producing the insulated core.

2. Description of the Related Art

In the prior art, it was customary to insulate motor cores using resin-based insulation coatings, powder-based coatings and electrostatically applied coatings. However, in applying such coatings, those skilled in the art encountered problems in forming films on angular areas of the core and in small crevices thereon. In instances requiring relatively thick coatings of the insulation film, motor cores have come to be insulated with the use of electrodeposition techniques. This technique is advantageous from the standpoint of rust prevention as well as for making it possible to form insulation films even on angular parts or in small crevices. (See, e.g., Toku Kai Sho 58-83559, Toku Kai Sho 58-83561 and Kokai Jitsuyo 61-205111).

As shown by these references, the performance of small motor cores is significantly affected by the thickness of the insulation film. That is, as the thickness is increased, the film-coated area of the winding becomes smaller, thereby making it necessary to restrict the number of windings. Even if the same number of windings may be used, the total length of the windings becomes greater, thereby adversely affecting the efficiency of the motor and making it difficult to reduce the size of the motor as a whole.

The above deficiencies are incapable of being overcome with the use of conventional coating techniques. Thus those who practice in the field of coating motor cores have moved toward the use of electrodeposition coating, which technique is capable of producing motors that have superior corrosion resistance. (Toku Kai Hei 01-278242)

However, even electrodeposited coatings on motor cores suffer from certain deficiencies. For example, Toku Kai Hei 8-265994 discloses a core having an electrodeposited film, which does not provide satisfactory insulation, produced by electrodeposition upon a core for a motor that drives a magnetic memory medium such as a hard disk. The problems with the coating are attributable to thickening of the coating along the edge of the core.

As described in the above reference, the tin (Sn) component of the aqueous coating solution used in the electrodeposition coating process is present in an amount of less than 12 ppm. As the amount is increased, the coating becomes thicker. The amount of carbon black is set at less than 0.5 weight per cent. An insulation film is electrodeposited to a prescribed thickness on the parts of the motor (i.e., the plastic magnet of the Nd—Fe—B system, the core made of silicon steel, and the motor base formed of die-cast aluminum) by means of cation electrodeposition coating employing an electrodeposition paint which was prepared by adding $TiO_2$ and/or $SiO_2$ to the paint. The painted parts are heated to between 40 and 120 degrees centigrade, following which a second-stage hardening treatment is carried out wherein the parts are heated to between 150 and 190 degrees centigrade.

The reference discloses that in a hard-disk drive device prepared by assembling the coated parts, there is no scattering of the tin and no destruction of the memory. A disc drive device having satisfactory corrosion resistance and insulation properties is thus obtained.

Insulating films formed via electrodeposition coating are characterized in that, as opposed to those formed by spray coating, an electrodeposited film can be formed everywhere upon the surface of a device, including the corners, no matter how complicated the shape involved may be. Electrodeposited coatings are further characterized in that the insulation film may have a minimal thickness, thereby rendering the technique advantageous from the standpoint of permitting a reduction in size of the coated part. Nevertheless, even with the use of electrodeposition coating techniques, it is difficult to ensure that the thickness of the coated film at an angular portion of the coated device is the same as the thickness of the film on the planar portions thereof, thus rendering it substantially inevitable that the film at the aforementioned angular portions will be thinner than that on the planar portions. In view of the fact that, moreover, the tension at the time of winding is concentrated at the angular portions, the reduced thickness of the film at such angular portions, results in incursion of the winding whereupon the winding comes into contact with an uninsulated portion of the part, thereby leading to an insulation failure. Furthermore, the reduced thickness of the electrodeposited film at such angular portions often permits rusting of the coated part.

Accordingly, it is problematic in the case of an electrodeposited coating, to form a film having a uniform thickness, including upon the angular portions of the coated part, thereby rendering it difficult to reduce the size of the core, as well as that of motors containing such cores.

Further to the above, where the core is insulated solely with the use of an electrodeposition coating (which forms a coating film), if the thickness of the electrodeposited film is increased in an effort to ensure an adequate thickness on the angular portions of the core, the rate of occurrence of gas pin-holes rises, depending upon the conditions governing the electrodeposition, thereby rendering it difficult to obtain the anticipated degree of insulation. Thus, electrodeposition coatings alone do not necessarily provide a stable and reliable insulated coating film. This deficiency is demonstrated by the results of Pressure-Resistance tests on electrodeposition-coated films, the results of which are indicated below. The Pressure-Resistance test is well-known among those of ordinary skill in this art as a means of measuring resistance to passage of a current, also referred to herein as "pressure resistance" or "electrical pressure resistance", through a coated object. The test is performed by connecting electrical leads to a coated and an uncoated surface, respectively, of an object, such as a motor core, and passing an alternating current (AC) measuring, e.g., 100, 200 and/or 500 volts (V) between the leads. Where the electrodeposited film thickness was 25 μm, the rate of failure under AC 100V pressure was 70 per cent. When the film thickness was 30 μm, the rate of failure under AC 200V pressure was 85 per cent. With a film thickness of 40 μm, the rate of failure under AC 200V pressure was 50 per cent. When the film thickness measured 50 μm, the rate of failure under AC 500V pressure was 40 per cent. The above results indicate that it is difficult, with the use of a electrodeposition coated film alone, to achieve 500V pressure resistance, even when the thickness of the film is increased.

The present invention is directed to a motor core wherein the above-described problems have been solved. In one example, the invention relates to a core with an insulating coating that is thin and has satisfactory rust-preventive and insulation properties, that does not lead to problems in connection with the winding of the slot of the motor core, and that is suitable for use in the preparation of a small-sized precision motor of high efficiency.

These objectives are achieved by the motor core of the invention in which, as described below, an electrodeposition coating is provided mainly for the purpose of rust prevention. Preferably, the insulating film coating includes a multi-layer laminated structure having: an electrodeposited layer, a comparatively soft insulation layer whose purpose is to form a uniform film and to allow production of a desired film thickness on angular portions of the coated substrate, and a relatively harder insulation layer adapted to prevent incursion due to tension at the time of winding.

Other features and advantages of the present invention will become apparent from the following description of the invention which refers to the accompanying drawings.

BRIEF DESCRIPTION OF THE DRAWINGS

FIG. 3 illustrates the progression by which a core coated on a first surface with an electrodeposition coating, a first spray coated film and a second spray coated film is thereafter coated, on a second opposed surface with an electrodeposited film (3a), followed by a first spray coated film (3b) and then a second spray coated film (3c);

FIG. 4 illustrates a laminated coated film structure formed according to the invention as deposited upon the surface of a motor core;

SUMMARY OF THE INVENTION

Figure 1A:
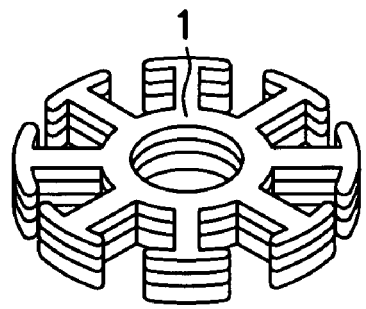
FIG. 1a illustrates an uncoated motor core.
Figure 1B:
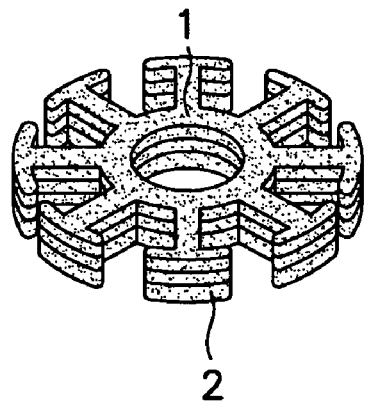
FIG. 1b illustrates the motor core coated with an electrodeposited film according to the invention.
Figure 2A:
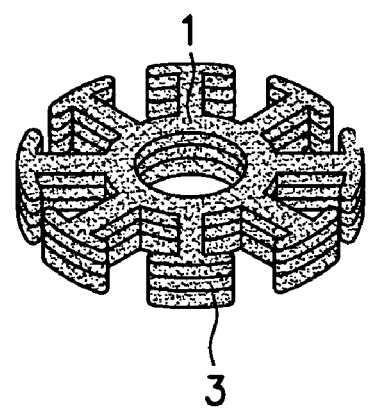
FIG. 2a illustrates the electrodeposition-coated core of FIG. 1b further provided with a first spray coated film.
Figure 2B:
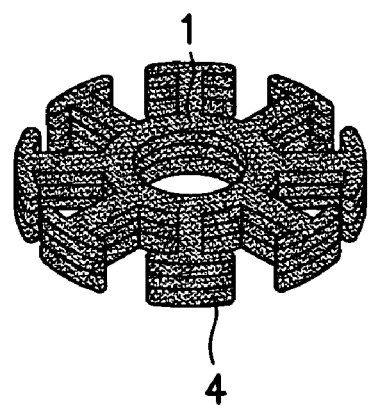
FIG. 2b illustrates the first-spray coated core of FIG. 2a additionally coated with a second spray coated film.
Figure 5:
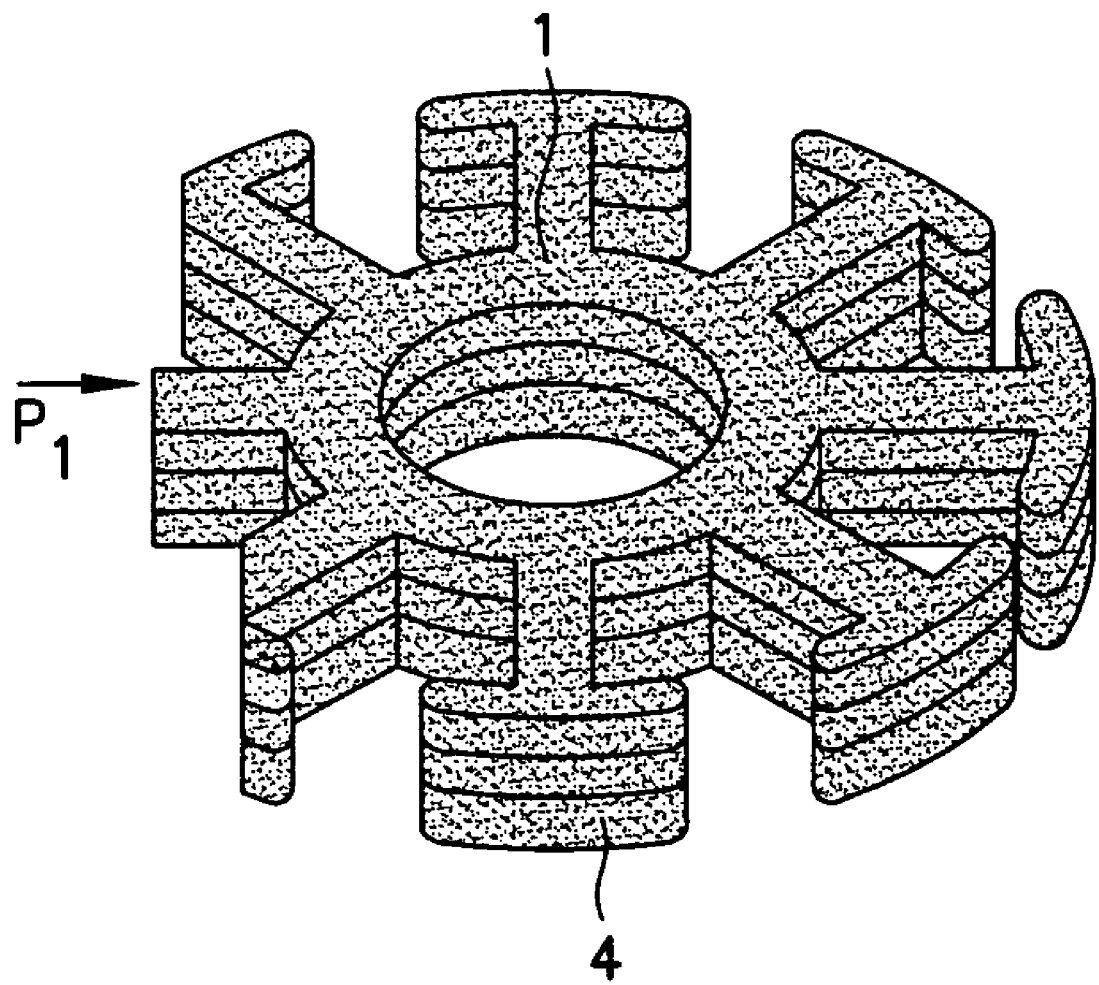
FIG. 5 is provided for the purpose of illustrating the location of P1 (Position 1) where the photomicrographs of FIGS. 6 and 7 were taken.

In one embodiment, for example, the present invention provides a motor core coated with a multi-layer insulating film, which preferably includes, in order: an electrodeposited coating film applied upon an outer surface of the motor core; a first spray-coated insulating film applied upon an outer surface of the electrodeposited coating film, the first spray-coated film having a pencil hardness of between about 2H and 4H; and a second spray-coated insulating film applied upon an outer surface of the first spray-coated insulating film, the second spray coated film having a pencil hardness of between about 3H and 6H.

Preferably, the invention further provides a motor core coated with a multi-layer insulating film wherein the insulating film preferably includes, in order: an electrodeposited coating film applied upon an outer surface of the motor core, the electrodeposited coating film having a mean thickness of between about 10 and 25 μm; a first spray-coated insulating film applied upon an outer surface of the electrodeposited coating film, the first spray-coated insulating film having a mean thickness of between about 20 and 35 μm and a pencil hardness of between about 2H and 4H; and a second spray-coated insulating film applied upon an outer surface of the first spray-coated insulating film, the second spray-coated insulating film having a mean thickness of between about 5 and 15 μm and a pencil hardness of between about 3H and 6H.

In another example, the invention additionally provides a motor core coated with a multi-layer insulating film wherein the insulating film preferably includes, in order: an electrodeposited coating film applied upon an outer surface of the motor core, the electrodeposited coating film formed from an anionic or a cationic electrodeposition paint and having a mean thickness of between about 10 and 25 μm; a first spray-coated insulating film applied upon an outer surface of the electrodeposited coating film, the first spray-coated insulating film formed from an epoxy paint and having a mean thickness of between about 20 and 35 μm and a pencil hardness of between about 2H and 4H; and a second spray-coated insulating film applied upon an outer surface of the first spray-coated insulating film, the second spray-coated insulating film being formed from a paint having a denatured silicate resin obtained by reacting a silicate resin with silicic acid and having a mean thickness of between about 5 and 15 μm and a pencil hardness of between about 3H and 6H.

In a further example, the invention further provides a method for preparing a motor core coated with a multi-layer insulating film, wherein the method includes: coating a motor core having first and second opposed surfaces, with an electrodeposited coating film; applying, to an outer surface of the electrodeposited film, a first spray-coated insulating film having a pencil hardness of between about 2H and 4H; and applying, upon an outer surface of the first spray-coated insulating film, a second spray-coated insulating film having a pencil hardness of between about 3H and 6H.

In another example, the invention provides a method for preparing a motor core coated with a multi-layer insulating film, wherein the method includes: coating a motor core, having first and second opposed surfaces, with an electrodeposited coating film; placing the electrodeposition coated core upon a coating tool (e.g., a wire mesh); applying, to an outer portion of a first surface of the electrodeposited film, a first spray-coated insulating film having a pencil hardness of between about 2H and 4H; applying, upon an outer portion of the first spray-coated insulating film on the first core surface, a second spray-coating insulating film having a pencil hardness of between about 3H and 6H; turning the motor core over upon the coating tool so as to expose the second opposed surface thereof for further coating; applying, to an outer portion of a second surface of the electrodeposition film, a first spray-coated insulation film having a pencil hardness between about 2H and 4H; and applying, upon an outer portion of the first spray-coated insulating film on the second opposed core surface, a second spray-coated insulating film having a pencil hardness of between about 3H and 6H.

In another example, the invention additionally provides a method for preparing a motor core coated with a multi-layer insulating film, wherein the method includes: coating a motor core having first and second opposed surfaces, with an electrodeposited coating film; placing the electrodeposition-coated core upon a coating tool; applying, to an outer portion of a first surface of the electrodeposited film, a first spray-coated insulating film having a pencil hardness of between about 2H and 4H; turning the core over upon the coating tool to expose the second opposed surface of the core; applying, to an outer portion of a second surface of the electrodeposited film, a first spray-coated insulating film having a pencil hardness of between about 2H and 4H; applying, upon an outer portion of the first spray-coated insulating film on the second opposed core surface, a second spray-coated insulating film having a pencil hardness of between about 3H and 6H; turning the core over on the coating tool to expose the coated first surface of the core; and applying, upon an outer portion of the first spray-coated insulating film on the coated first core surface a second spray-coated insulating film having a pencil hardness between about 3H and 6H.

In a further example, the invention also provides a method for preparing a motor core coated with a multi-layer insulating film, wherein the method includes: coating a motor core having first and second opposed surfaces, with an electrodeposition coating film; placing the electrodeposition-coated core upon a coating tool; applying, to an outer portion of a first surface of the electrodeposited film, a first spray-coated insulating film having a pencil hardness of between about 2H and 4H; turning the core over on the coating tool to expose the second, opposed surface of the core; applying, to an outer portion of a second surface of the electrodeposited film, a first spray-coated insulating film having a pencil hardness of between about 2H and 4H; turning the core over upon the coating tool to expose the first surface of the core; applying, upon an outer portion of the first spray-coated insulating film on the first core surface, a second spray-coated insulating film having a pencil hardness of between about 3H and 6H; turning the core over upon the coating tool to expose the second surface of the core; and applying, upon an outer portion of the first spray-coated insulating film upon the second opposed core surface, a second spray-coated insulating film having a pencil hardness of between about 3H and 6H.

DESCRIPTION OF THE EMBODIMENTS

In an example of the invention, as shown in FIG. 4, the invention relates to a motor core 1 coated on its entire outer surface with a multi-layer insulating film, having three layers: (a) an electrodeposition coated film layer 2, (b) a first spray coated insulation film layer 3 having a pencil hardness in the range between 2H and 4H, and (c) a second spray coated insulation film layer 4 having a pencil hardness in the range between 3H and 6H, and to methods for producing such coated cores. The pencil hardness test is a standard Japanese test for evaluating coating hardness, wherein the hardness of a coating is determined by comparison with a standard set of grading pencils ranging from hard to soft. The test involves applying the pencils, beginning with relatively hard pencil and working toward the softer pencils, to the coating. The first pencil which does not scratch the coating determines the pencil hardness of the coating.

In another embodiment of the invention, core b 1 has a structure including a plurality of laminated metal plates, as shown in FIGS. 1–5. In another example, the mean thickness of the electrodeposited film is in the range of between about 10 and 25 µm while that of the first spray coated insulation film is in the range of between about 20 and 35 µm and wherein the second spray coated insulation film has a thickness in the range of between about 5 and 15 µm.

According to a further example, the second spray insulated film may be formed with a denatured silicate resin paint that is obtained by reacting the resin with silicic acid.

Preferably according to the invention, the electrodeposited film may include either a cationic or an anionic electrodeposition paint. The first spray coated insulation film can be an epoxy paint.

In a further example, the electrodeposition coated film is substantially free of lead (Pb) and/or tin (Sn) and silicon.

Another example of the invention provides a method for the preparation of a motor core coated with an insulation film having three film layers, wherein the layers each have different attributes. In one example of such method, the core is coated with an electrodeposited film layer 2. Thereafter, a first spray coating is applied to the surface of the electrodeposited film and dried to form a first spray coated insulation film 3 thereupon whose pencil hardness is in the range between 2H and 4H. Subsequently, a second spray coating insulation film 4, having a pencil hardness of between about 3H and 6H is formed by applying, and then drying, a second spray coating upon the surface of the first spray coated film layer 3.

In a further example, the core is positioned on a coating tool, e.g., a metal mesh (not shown) during the coating operation. Subsequent to the application of the electrodeposition film 2 upon the entire core 1, a first spray coating layer is applied to the first surface of the motor core with heating in the range between 180 and 200 degrees centigrade to form a first spray coated insulation film layer 3 thereupon. As used herein, the term "top" refers to the surface of the motor core not in contact with the mesh, whereas "bottom" is used to describe the surface opposed to the top surface. Following the application of the first spray coated insulation film 3 to the first surface of the core, a second spray coated insulation layer is also applied to the first surface of core 1, atop film layer 3, in the same manner as the first spray coating layer. The structure coated with the second spray coated insulation layer is again heated in the range between 180 and 200 degrees centigrade, thereby forming a second spray coated insulation film 4 on the first surface coated with the first spray coated insulation film 3.

Following the coating of the first surface of core 1, the core is preferably flipped over, i.e., placed upside down, upon the mesh such the top of the core is now on the bottom. The first spray coating material may then be applied to the thus exposed second opposed surface of the motor core, following which the spray-coated core is heated in the range between 180 and 200 degrees centigrade, thereby producing upon the sprayed portion of the second opposed surface a coating of the first spray coated insulation film 3. Subsequently, the second spray coating may be applied in the same manner atop the first film 3, and the core 1 is then heated to the range between 180 and 200 degrees centigrade, thereby forming the second spray coated insulation film 4 atop film 3 on the second opposed surface of the core 1.

In an alternate example of the invention, the first spray coating is applied atop the electrodeposited coating 2 from the top of the first surface of the motor core, with time left for thinner evaporation and coat leveling, thus forming the first spray coated insulation film layer 3 thereupon. Thereafter, the second spray coating is applied to the first surface in the same manner, with heating being carried out in the range between 180 and 200 degrees centigrade, thereby forming on top of first layer 3 the second spray coated insulation film layer 4. Core 1, now coated on its first surface, is then turned upside down such that the top is now on the bottom. The first spray coating is then applied to the electrodeposited layer 2 on the second opposed surface of the motor core with a corresponding delay for thinner evaporation and coat leveling to form the first spray coated insulation film layer 3 thereupon. Next, the second spray coating is applied to the layer 3 on the second opposed surface and then heated to the range between 180 and 200 degrees centigrade, thereby forming the second spray coated insulation film layer 4 thereupon.

Through the use of the methods described herein, the above-described problems occurring with electrodeposition coatings of conventional products have been solved. Moreover, mass production has thus been made possible and the rate of product failure due to, e.g., chipping as described below, has been reduced.

When the electrodeposition-coated motor core is placed on the metal mesh, and the first spray coating step is carried out, the film heating serves as a hardening treatment for converting the liquid spray composition into a film. When the motor core is removed from the metal mesh, the resin located at the bottom part of the coated core which touches the metal mesh is sometimes torn away. This phenomenon is referred to as "chipping" and such products are treated as having a defect.

The methods of the present invention serve to reduce the amount of chipping which occurs during core coating. The reason why there is a decrease in the rate of chipping is believed to be due to the fact that the paint used to form the second spray coating has a denatured silicate resin. This material is different from the material used to produce the first spray coating, which previously sometimes adhered to the metal mesh. The coating steps used in the invention are preferably thus arranged in such a manner that the coating material which adheres to the metal mesh is covered over by a non-stick second spray coating. This has served as a means for improving the yield of acceptable product.

Coated motor cores formed according to this invention are relatively thin and possess satisfactory insulation properties, even at angular portions of the core. The coating is adapted to permit even winding, with angular portions of the coil being given a satisfactory tension in the winding of the slot of the motor core, thereby offering a high rate of winding efficiency. Thus, the invention is suitable for use in the production of small precision motors.

The methods described herein result in the formation of a uniform insulation coating on all areas of the motor core, including the angular-shaped portions. These methods additionally render it possible to control the amount of chipping which occurs during the baking stage, thereby increasing the productivity of the coating method.

In one example of the invention, the material used in forming the electrodeposition coating 2 upon the surface of the core 1 may be either an anionic or a cationic electrodeposition paint.

Any electrodeposition paint resins may be used. However, it is desirable to employ a resin selected from among epoxy resins, urethane resins, polyester resins, and polyamide resins. These resins are well known among those of ordinary skill in the chemical coating art. The preferred resins for use in the present invention are the epoxy resins.

The following materials are particularly preferably useful in the formation of electrodeposited coatings in accordance with the invention: (See, e.g., Toku Kai Hei 6-41788)

a) a reaction product obtained by the reaction between a polyoxyl resin and a cationation agent,
b) the polycondensate formed by a reaction between polycarboxylic acid and a polyamine, treated or reacted with an acid,
c) the polyadditive formed by a reaction between a polyisocyanate and a polyol and mono or polyamine, as treated or reacted with an acid,
d) a copolymer of a composition having a hydroxyl group and an acryl system containing an amino group or a monomer of the vinyl system, as treated or reacted with an acid, and
e) an additive formed by a reaction between polycarbonic acid resin and alkylamine, as treated or reacted with an acid.

Preferably, the film used for forming the electrodeposition coating should have a thickness ranging between about 10 and 25 μm on the average at the time of heating to induce film-formation. When the mean film thickness is less than 10 μm, the pressure resistance is reduced, even though the coating is effective in forming a rust preventive film over the entire core, including the angular portions such as at the corners. Furthermore, difficulties additionally arise in connection with the insulation of the edge portions of the coated core 1.

Conversely, when the mean film thickness exceeds 25 μm, the length of time required for forming the electrodeposition coating increases. At the same time, it becomes more difficult for the gas that is trapped within the coated film to escape. Thus, there is an increased chance that gas pin holes will develop in the coating and/or that the coating will swell, both of which are undesirable. At the same time, when the coating is applied in the indicated thickness, it becomes difficult to secure a uniform film thickness throughout the coated core, including the angular portions of the core. That is, there will be an increase in the difference of the file thickness between the flat portion and the angular portions of the coated core In one example, the resin that is to be used to form the first spray coated insulation film layer 3, whose pencil hardness is in the range between 2H and 4H, is the same class or type of resin as that used to form the electrodeposition coating. For example, the resin used in forming both the electrodeposition coating and the first spray coated insulation film layer may be an epoxy resin. In a further embodiment, approximately 10 weight per cent of acrylic resin is added to the epoxy resin for the purpose of hardening the composition.

In instances where the epoxy paint includes an epoxy resin dissolved in a solvent, the ratio between the epoxy resin and the solvent may preferably range between 15–25: 85–75 by weight.

Preferred solvents for dissolving the epoxy resin are those whose main ingredients are toluene and n-butyl alcohol. One or more of methyl ethyl ketone, cyclohexanone, isopropyl alcohol, propylene glycol mono-methyl ether acetate, etc., can also be added to form a solvent mixture.

In further examples, the epoxy paints used in the invention may additionally contain a small amount of a hardening agent, such as zinc phosphate, etc. or a constitutional pigment such as talc, etc. Additional examples of useful materials falling within the indicated classes are well known among those of ordinary skill in this art.

Furthermore, the epoxy resin paint, constituted as discussed above, may be thinned by the addition of thinners commonly used for spray painting. Such thinners may contain, for example, xylene, ethyl benzene and cyclohexanone as the main ingredients, with the further addition of isopropyl alcohol, n-butyl alcohol, ethylene glycol, monobutyl ether, methyl isobutyl ketone and the like. The ratio between the paint and the thinner is that which is ordinarily used in the painting field.

Preferred resins for use in forming the second spray coated insulation film layer 4 of this invention are those wherein the terminal functional group of the organic polymer and the terminal functional group of an inorganic bridging agent are reacted with each other, thereby producing a bridged polymer that has both flexibility and hardness. For example, it is desirable to use a paint that is capable of forming a hard film when reacted with silicic acid. Examples of paints which may be used in the invention for forming the second spray coated insulation film layer 4 include paints having denatured silicate resins.

Suitable solvents for use with paints for forming the layer 4 may include, for example, but are not limited to, isopropyl alcohol, diacetone alcohol, cyclohexanone and ethylene glycol monobutyl ether as the main ingredients. These solvent compositions may further include materials such as n-butyl alcohol, butyl acetate and formaldehyde. Paints for use in the coating process of the invention are prepared as described above, including the addition of a thinner so as to form a thinned spray paint. Useful thinners may include xylene and ethyl benzene as the main ingredients, with additive materials such as ethyl ester acetate, n-butyl alcohol, toluene and acetic acid isobutyl ester, etc. added thereto. The ratio between the paint and the thinner is in the range which is ordinarily used in the spray-painting field.

EXAMPLES

The following example embodiments are provided only for the purpose of illustrating the invention and are not to be construed as limiting the invention in any manner.

Example 1

This example describes the preparation of a motor core having a multi-layer insulating film structure thereupon by means of the painting method as described above. The core is turned upside down to expose the second opposed surface subsequent to the hardening of the first and second spray coated films applied upon the first surface of the core.

Application of the Electrodeposition Coating to the Core

A core 1 having a plurality of silicate steel plates was electrodeposition coated using a paint having a denatured amino epoxy resin as a vehicle. Since this paint has cationic properties, a 200 volt direct current voltage was passed between the core 1 as a cathode and the container as an anode. The temperature of the paint solution was in the range of 25–28 degrees centigrade, with the immersion time being two minutes. The coated core was placed in a drying furnace, supported by an electrode. It was subjected to a pre-heating step at a temperature in the range between 40 and 120 degrees centigrade, and then heated at a temperature in the range between 180 and 200 degrees centigrade for hardening (as used herein, "hardening" is the process by which the film is formed from the spray-painted coating). Upon removal from the furnace, the core was found to be coated on its entire surface with a 20 µm electrodeposited film 2 having a mean film thickness of 20 µm, using measurements taken at three points on the core (i.e., referred to herein as the three-point [or triple point] measurement method)

Application of the First Spray Coating onto the Electrodeposition-Coated Core

A plurality of cores coated with an electrodeposited film 2 whose mean film thickness was 20 µm were arranged on a metal mesh. The first spray coating was applied upon the entire upper surfaces of the cores.

The first spray coating included paint prepared as follows: an epoxy paint including 19.6 weight percent of epoxy resin, 1.9 weight per cent of acrylic resin, 71.3 weight percent of a solvent whose ingredients were toluene, n-butyl alcohol, methyl ethyl ketone and cyclohexanone, with the addition of isopropyl alcohol, and propylene glycol monomethyl ether acetate, 4.1 weight per cent of talc and 3.1 weight per cent of zinc phosphate, was thinned with a thinner whose main components were diluted by a factor of 1.2 times its original volume with xylene, ethyl benzene and cyclohexanone, and which further included isopropyl alcohol, n-butyl alcohol, ethylene glycol monobutyl ether and methyl-isobutyl ketone.

Following application of the first spray coating layer to the first surface of the core, the coated core was placed in a drying furnace. After a preliminary heating step at a temperature in the range between 40 and 120 degrees centigrade, the first spray coating layer was hardened into a film at a temperature in the range between 180 and 200 degrees centigrade for a period of approximately 20 minutes. Thus, a first spray coated insulation film layer 3 was formed on the first surface of the electrodeposited layer 2. Film 3 had a mean film thickness of 30 µm as measured by the triple-point measurement method. The pencil hardness of the first spray coated film was in the range between 2H and 4H. (see FIG. 1.)

Following the hardening of the first spray coated layer, the core was turned upside down on the metal mesh and the second opposed surface of the core was given a spray coating with the first spray paint. The spray painted core was then placed in a drying furnace. After a preliminary heating treatment in the range between 40 and 120 degrees centigrade, it was heated for approximately 20 minutes in the range between 180 and 200 degrees centigrade to permit hardening of the first spray paint coating. As a result of this treatment, a first spray film 3 whose average film thickness was 30 µm as measured by the triple-point measurement method was formed upon the second opposed surface. The pencil hardness of the first spray coated film 3 was in the range between 2H and 4H.

Application of the Second Spray Coating on the First Spray-Coated Core

The core 1 on which the first spray coated film 3 having a mean film thickness of 30 µm was formed was then coated on its second surface with the second spray coating while the core 1 was supported on a metal mesh. The second spray paint was prepared as set forth below.

12.0 weight per cent of denatured silicate resin was added to 88.0 weight per cent of a solvent whose main ingredients were isopropyl alcohol, diacetone alcohol, cyclohexanone and ethylene glycol monobutyl ether, to which was added n-butyl alcohol, butyl acetate and formaldehyde. The composition was thinned with a thinner whose main ingredients were diluted by a factor of 1.5 times with xylene, ethyl benzene, and toluene, to which ethyl ester acetate, n-butyl alcohol and isobutyl ester acetate were added.

The coated product was heated in a drying furnace at a temperature in the range between 180 and 200 degrees centigrade for a period of about 20 minutes to harden the coating into a film. The heating thus produced a second spray coated insulation film layer 4 on the second surface having a mean thickness in the range between 7 and 10 µm as measured by the three-point measurement method. The pencil hardness of the second spray coated film 4 was greater than 4H. (see FIG. 2.)

After the second spray coated film was hardened, the coated 4 core was turned over on the metal mesh and the second spray coating was applied to the first film 3 on the first surface of the core. The spray coated core was thereafter placed in a drying furnace and heating was carried out in the range between 180 and 200 degrees centigrade for a period of about 20 minutes to form the second spray coated insulation film layer 4 on the first surface. The pencil hardness of the second spray coated film 4 was greater than 4H.

The core produced as described above was thus coated on both its first and second opposed surfaces with, in order, an electrodeposited film 2; a first spray coated insulation film layer 3; and a second spray coated insulation film layer 4. Application of this multi-layer insulating coating provided a core having advantageous properties as described above.

Example 2

This example relates to the preparation of a motor core having a triple-layer insulation coated film structure by a coating method wherein the core is turned over to expose its opposite surface subsequent to the initial first spray coated film hardening, then again after the second first spray coated film hardening and once again after the first second spray coated film hardening.

Application of the Electrodeposition Coating to the Core

The electrodeposition was carried out on a core 1 formed of a plurality of silicon steel plates. It was performed using a paint (having a Pb content less than 25 ppm and a Sn content less than 10 ppm) having a denatured amino epoxy resin as a vehicle.

The paint was cationic and thus a direct current of 200 volts was passed between the core serving as a cathode and the container which served as an anode. The temperature of the paint solution was in the range between 25 and 28 degrees centigrade and the immersion time was two minutes. Next, the electrodeposited core was placed in a drying furnace, where it was supported by an electrode. After a preliminary heating step in the range between 40 and 120 degrees centigrade, the electrodeposited core was heated for a period of about 20 minutes in the range between 180 and 200 degrees centigrade to permit drying of the coating. Following this treatment, an electrodeposition coated film 2 having a mean thickness of 20 µm as measured by the triple-point measurement method was formed upon the entire outer surface of the core 1.

Application of the First Spray Coating onto the Electrodeposition-Coated Core The core, having an electrodeposited film 2 whose mean thickness was 20 µm, was placed on a metal mesh made of stainless steel and the first spray coating was applied upon the first surface of the core.

The first spray paint was prepared as follows: an epoxy paint was formed by combining 19.6 weight per cent epoxy resin, 1.9 weight per cent acrylic resin, 71.3 weight per cent of a solvent whose main ingredients were toluene, n-butyl alcohol, methyl ethyl ketone and cyclohexanone, with the addition of isopropyl alcohol, and propylene glycol monom- ethyl ether acetate, 4.1 weight percent of talc and 3.1 weight per cent of zinc phosphate. The composition was thinned with a thinner whose main ingredients were diluted by a factor of 1.2 with xylene, ethyl benzene, and cyclohexanone, with the addition of isopropyl alcohol, n-butyl alcohol, ethylene glycol monobutyl ether and methyl-isobutyl ketone. The above composition was used in forming the first spray coating.

The first-spray coated core was placed in a drying furnace and heated in the range between 180 and 200 degrees centigrade for approximately 20 minutes to permit the spray coating to harden into a film. As a consequence of this treatment, a first spray coated insulation film layer 3, having a mean film thickness as measured by the three-point measurement method of 30 µm, was formed on the first surface of the core. The pencil hardness of the first spray coated film 3 was in the range between 2H and 4H. (see FIG. 1.)

Subsequent to the hardening of the first spray coated insulation film layer 3, the core was turned over 180 degrees on the metal mesh and the first spray coating was applied to the second opposed core surface exposed thereby. The spray-coated core was then placed in a drying furnace. After a preliminary heat treatment in the range between 40 and 120 degrees centigrade, the coated core was heated in the range between 180 and 200 degrees centigrade for approximately 20 minutes to permit hardening of the spray coating into a film. The pencil hardness of the first spray coated insulation film layer 3 applied to the second opposed surface of the core was in the range between 2H and 4H.

Second Spray Coating on the Core Having the First Insulating Film Layer

The core on which the first spray coated insulation film layer 3 had been formed was again turned over on the stainless steel mesh and the second spray coating was applied to the entire first surface of the coated core.

The paint of the second spray was prepared as set forth below:

A denatured silicate resin whose main ingredients were 12.0 weight per cent of denatured silicate resin and 88.0 mass per cent of a solvent whose main ingredients were isopropyl alcohol, diacetone alcohol, cyclohexanone and ethylene glycol monobutyl ether, with the addition of n-butyl alcohol, butyl acetate and formaldehyde, was thinned with a thinner whose main ingredients were diluted by a factor of 1.5 with xylene, ethyl benzene and toluene, and further including ethyl ester acetate, n-butyl alcohol and isobutyl ester acetate added thereto.

The coated product was placed on a metal mesh and was heated in the range between about 180–200° C. for a period of between about 20 minutes. Following this treatment, a second spray coated insulation film layer 4 having a thickness of 10 µm was formed on the first surface of the core. The pencil hardness of the second spray coated insulation film layer 4 was 4H. (see FIG. 4.) After the hardening of the second spray coated film 4, the core was once again turned over on the metal mesh. The second opposed surface of the core was then coated using the second spray paint. The spray-painted core was then placed in a drying furnace and heated in the range between 180 and 200 degrees centigrade for a period of about 20 minutes. The pencil hardness of the second spray coated insulation film layer 4 formed on the second opposed surface was greater than 4H.

The above process resulted in the formation of an insulated core having a multi-layered insulation coating having a layer of an electrodeposition coating, followed by a first and a second spray coated insulation film layer.

Example 3

This example describes the preparation of a motor core that has a triple-layer insulation coated film structure based on the method wherein the core was turned over only after the initial second spray coating.

The method used in this example is especially suited to mass production with a high degree of product quality.

The electrodeposition coating was carried out in accordance with the invention using a paint whose Pb content was less than 10 ppm and whose Sb content was less than five ppm applied to core 1 formed of a plurality of laminated silicon steel plates. The paint included a denatured amino epoxy resin as a vehicle.

Since the paint is cationic, a direct current voltage of 200 volts was passed between the core as the cathode and the container as the anode. The temperature of the paint solution was in the range between 25 and 28 degrees centigrade and the immersion time was two minutes.

The coated core, supported by an electrode, was placed in a drying furnace. After a preliminary heat treatment in the range between 40 and 120 degrees centigrade, it was heated in the range between 180 and 200 degrees centigrade for a period of about 20 minutes for permit hardening of the paint. Following this treatment, an electrodeposition coated film 2 having a mean film thickness of 20 µm, as measured by the three-point measurement method, was formed upon the entire outer surface of core 1.

First and Second Spray Coating Spray Coating On the First Surface of the Core The core, having electrodeposited film 2 whose mean film thickness was 20 µm formed thereupon, was arranged on a metal mesh. The first spray coating was applied upon the first surface of the core.

The first spray paint was prepared as follows: an epoxy paint was prepared having, as its main ingredients, 19.6 weight per cent epoxy resin, 1.9 weight per cent acrylic resin, 71.3 weight per cent of a solvent comprised of isopropyl alcohol, propylene glycol, monomethyl ether acetate, 4.1 weight percent of talc, and 3.1 weight percent of zinc phosphate. The composition was thinned with a thinner whose main ingredients were isopropyl alcohol, n-butyl alcohol, ethylene glycol monobutyl ether and methyl-isobutyl ketone and was used to deposit the first spray coating upon the surface of the electrodeposition coated core 2.

The spray painted core coated with a layer of the first spray paint on its first surface was placed in a drying furnace and heated in the range between 180 and 200 degrees centigrade for a period of about 20 minutes to cause the paint to harden to a film. Following this treatment, a first spray coated insulation film layer 3 having a mean film thickness as measured by the triple-point measuring method of 300 µm was formed on the first surface of the core. The pencil hardness of the first spray coated film was in the range between 2H and 4H.

Thereafter, a second spray coating was also applied to the first surface of the core upon which the first spray coated film 3 whose mean film thickness was 30 µm had been formed.

The paint for the second spray coating was prepared as follows: a denatured silicate resin having 12.0 weight per cent of denatured silicate resin, isopropyl alcohol, diacetone alcohol, cyclohexanone, ethylene glycol monobutyl ether and 88.0 weight per cent of a solvent containing n-butyl alcohol, butyl acetate and formaldehyde was thinned with a thinner whose main ingredients were diluted by a factor of 1.5 with xylene, ethyl benzene and toluene, and which further included ethyl ester acetate, n-butyl alcohol and isobutyl ester acetate.

The second-spray coated product, upon a metal mesh, was placed in a drying furnace and heated in the range between 180 and 200 degrees centigrade for a period of about 20 minutes to harden the second spray coating. As a result of this treatment, a second spray-coated insulation film layer 4, having a mean film thickness in the range between seven and 10 µm as measured by the three-point measuring method was formed on the first surface of the core. The pencil hardness of the second spray coated film 4 was greater than 4H. (See FIG. 2.)

The First and Second Stray Coatings Are Applied to the Second Core Surface

When the motor core on which the second spray coated film 4 had been formed was turned over on a metal mesh made of stainless steel (see FIG. 3), the electrodeposited film 2 on the second opposed surface is therefore exposed for coating. Thereupon, the first spray paint (prepared as described above) was spray-coated upon the second opposed surface onto the electrodeposited layer 2 provided thereon. The first-spray painted coated core was placed in a drying furnace and heated in the range between 180 and 190 degrees centigrade for a period of about 20 minutes, so as to harden the first spray coating. As a result of this treatment, first spray coated insulation film layer 3, having a mean film thickness as measured by the three-point measurement method of 30 µm, was formed on the second opposed core surface atop the electrodeposited layer 2.

Thereafter, the second spray coating was applied to the first-spray coated film layer 3 on the second opposed surface of the core using the second spray paint described above. The thus-coated product, on a metal mesh, was placed in a drying furnace and heating was carried out at a temperature in the range between 180 and 190 degrees centigrade for a period of about 20 minutes to harden the spray.

This treatment resulted in the formation of second spray-coated insulation film layer 4 on the second opposed surface of the core whose mean film thickness was 10 µm as measured by the triple-point measurement method. The pencil hardness of the second spray coated film 4 was greater than 4H.

By use of the above-described coating procedure, it was possible to prepare a core 1 with a multi-layer insulation film having an electrodeposited film 2, a first spray coated insulation film layer 3 and a second spray coated insulation film layer 4 on its entire outer surface.

Examples 4 Through 10

Coated cores were produced under the conditions shown in Table 1 below in the same manner as described in Example 1 (A type), Example 2 (B type) and Example 3 (C type).

TABLE 1

| | Type | Electro-deposited film thickness | 1st spray coated film thickness | 2nd spray coated film thickness | Insulation property 500 v | Corrosion Resistance | Net Lag | Overall Property |
|---|---|---|---|---|---|---|---|---|
| Ex. 1 | A | 20 | 30 | 7–10 | ◯ | ◯◯ | △ | ◯ |
| Ex. 2 | B | 20* | 30 | 7–10 | ◯ | ◯◯ | △ | ◯ |
| Ex. 3 | C | 20* | 30 | 7–10 | ◯ | ◯◯ | ◯ | ◯◯ |
| Ex. 4 | B | 16 | 25 | 7–10 | △ | △ | △ | ◯ |
| Ex. 5 | A | 25* | 25 | 5 | ◯◯ | ◯ | △ | ◯ |
| Ex. 6 | B | 20 | 35 | 5 | ◯ | ◯◯ | X | △ |
| Ex. 7 | C | 15* | 20 | 7–10 | △ | △ | ◯ | ◯ |
| Ex. 8 | C | 20* | 20 | 7–10 | ◯ | △ | ◯ | ◯ |
| Ex. 9 | C | 25 | 35 | 5 | ◯◯ | ◯◯ | ◯ | ◯ |
| Ex. 10 | C | 20* | 25 | 7–10 | ◯ | ◯ | ◯ | ◯◯ |

*Pb content less than one ppm and Sn content less than three ppm.

Test Results

Insulation Characteristics

The entire peripheral surface of the coated cores was tested at 500 V. Passing rates are shown as follows: Double circle: 100 per cent (excellent). Single circle: Higher than 98 per cent (satisfactory). Triangle: 90 per cent (pass). Cross: less than 90 per cent (unsatisfactory).

Corrosion Resistance

Double circle: Passed hot-water test for 100 hours or more. The test consisted of soaking the coated part in hot water. Single circle: Passed a hot water test for 50 through 100 hours. Triangle: Passed a hot water test for 50 hours.

Net Lag

This is used to determine whether and to what degree a coating is damaged by laying a coated part upon a metal grid.

Single circle: 95 per cent non-existent. Triangle: 85 to 95 per cent non-existent. Cross: Less than 85 per cent.

Over-All Property

Double circle: Excellent. Single circle: Satisfactory. Triangle: Pass.

Figure 6:
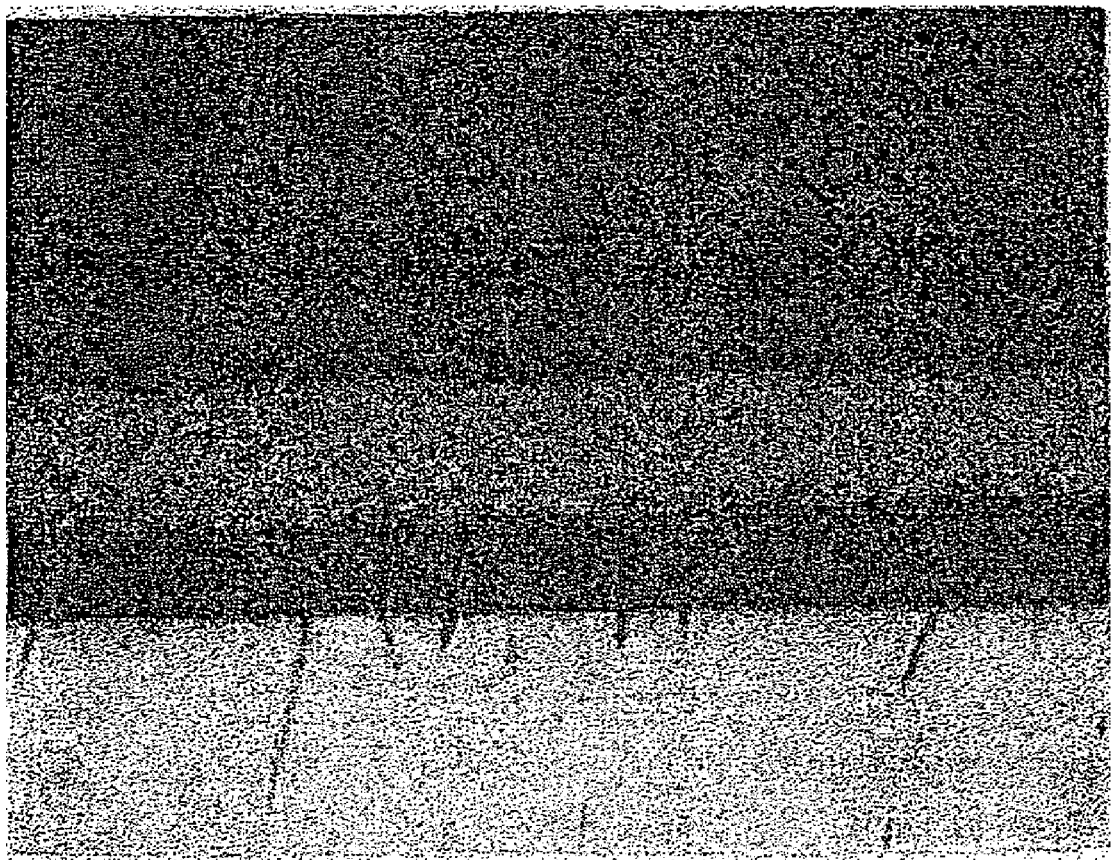
FIG. 6 is a photograph presenting a cross-sectional view, at position 1 of the film-coated core according to the invention.
Figure 7:
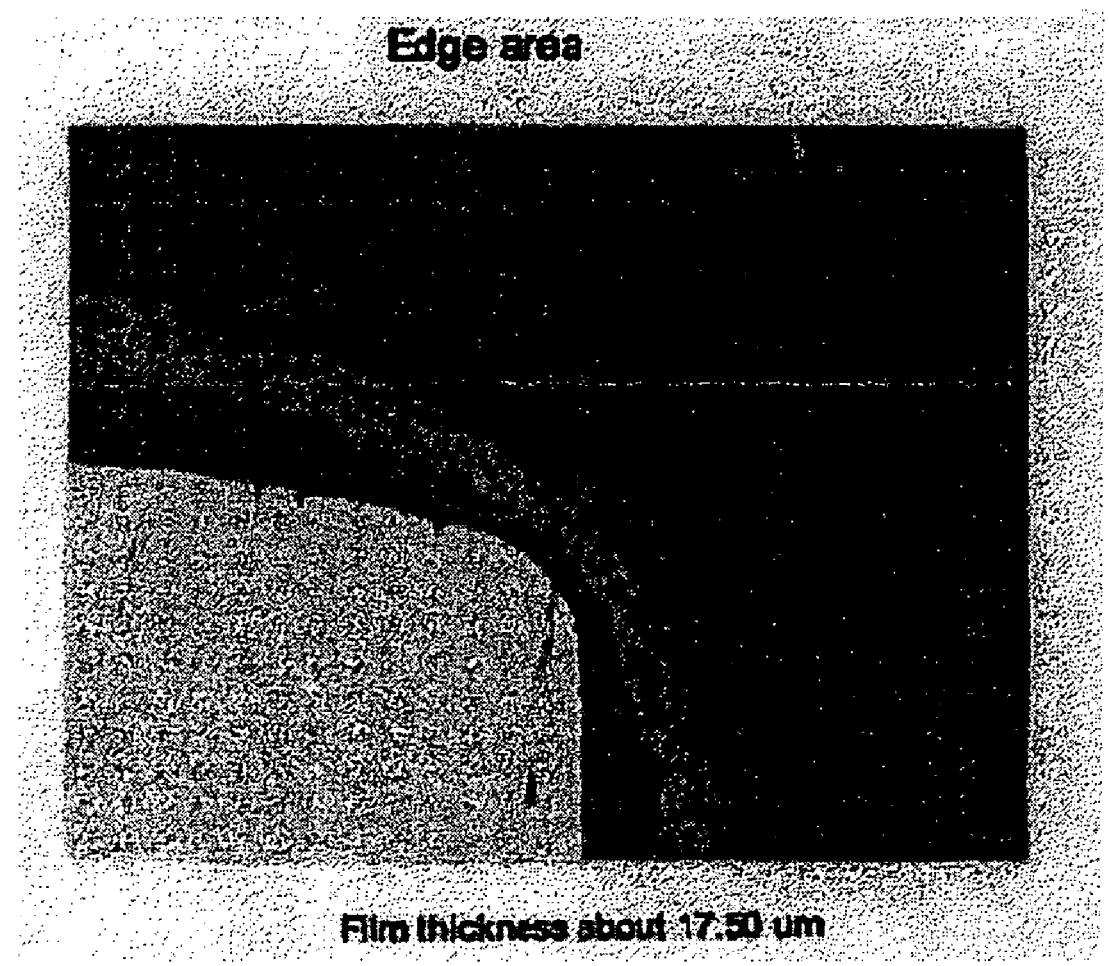
FIG. 7 is a photograph presenting a cross sectional view along an edge portion at position 1.

A photo-micrograph of the multi-layer core coating structure in accordance with the invention, taken in a cross-section at position P1 (see FIG. 5), prepared by the method of Example 3, is shown in FIGS. 6 and 7.

FIG. 7 shows that the electrodeposition coated film upon the core is thin, with the first spray coating and the second spray coating reinforcing the edge portion of the core. As the windings of the coil utilize the edge portion of the core as their fulcrum, both tenacity and flexibility of the edge are required.

The motor core of the invention thus may be provided with a triple-layer insulation coated film structure having a total film thickness in a range between approximately 40 and 75 μm, wherein the coating layers are chemically linked, and wherein the film structure significantly improves rust prevention, core insulation effect and operability.

The methods taught herein for preparing the insulated motor core are capable of reducing the rate of product failure and are suitable for use in mass production of insulated motor cores. Therefore, the methods are particularly useful in motor production and, particularly in the construction of small-sized motors.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A motor core coated with a multi-layer insulating film, said insulating film comprising:
   (a) an electrodeposited coating film applied upon an outer surface of the motor core;
   (b) a first spray-coated insulating film applied upon an outer surface of the electrodeposited coating film, the first spray-coated film having a pencil hardness of between 2H and 4H; and
   (c) a second spray-coated insulating film applied upon an outer surface of the first spray-coated insulating film, the second spray-coated film having a pencil hardness of between 3H and 6H.

2. The coated motor core of claim 1, wherein the core includes a plurality of laminated metal plates.

3. The coated motor core of claim 1, wherein the electrodeposited coating film has a mean thickness of between about 10 and 25 μm.

4. The coated motor core of claim 1, wherein the first spray-coated insulating film has a mean thickness of between about 20 and 35 μm.

5. The coated motor core of claim 1, wherein the second spray-coated insulating film has a mean thickness of between about 5 and 15 μm.

6. The coated motor core of claim 1, wherein the core includes a plurality of laminated metal plates, the electrodeposited coating film has a mean thickness of between about 10 and 25 μm, the first spray-coated insulating film has a mean thickness of between about 20 and 35 μm and the second spray-coated insulating film has a mean thickness of between 5 and 15 μm.

7. The coated motor core of claim 1, wherein the second spray-coated insulating film is formed from a paint having a denatured silicate resin obtained by reacting a silicate resin with silicic acid.

8. The coated motor core of claim 1, wherein the electrodeposited coating film is formed from a cationic electrodeposition paint.

9. The coated motor core of claim 1, wherein the first spray-coated insulating film is formed from an epoxy paint.

10. The coated motor core of claim 1, wherein the electrodeposited coating film is formed from a cationic electrodeposition paint and the first spray-coated insulating film is formed from an epoxy paint.

11. The coated motor core of claim 1, wherein the electrodeposited coating film is formed from an anionic electrodeposition paint.

12. The coated motor core of claim 1, wherein the electrodeposited coating film is formed from an anionic electrodeposition paint and the first spray-coated insulating film is formed from an epoxy paint.

13. The coated motor core of claim 1, wherein the first and the second spray-coated insulating films are substantially free of at least one of lead, tin and silicon.

14. A motor core coated with a multi-layer insulating film, the insulating film comprising:
   (a) an electrodeposited coating film applied upon an outer surface of the motor core, the electrodeposited coating film having a mean thickness of between about 10 and 25 μm;
   (b) a first spray-coated insulating film applied upon an outer surface of the electrodeposited coating film, the first spray-coated insulating film having a mean thickness of between about 20 and 35 μm and a pencil hardness of between 2H and 4H; and
   (c) a second spray-coated insulating film applied upon an outer surface of the first spray-coated insulating film, the second spray-coated insulating film having a mean thickness of between about 5 and 15 μm and a pencil hardness of between 3H and 6H.

15. The coated motor core of claim 14, wherein the core includes a plurality of laminated metal plates.

16. The coated motor core of claim 14, wherein the second spray-coated insulating film is formed from a paint having a denatured silicate resin obtained by reacting a silicate resin with silicic acid.

17. The coated motor core of claim 14, wherein the first spray-coated insulating film is formed from an epoxy paint.

18. The coated motor core of claim 14, wherein the electrodeposited coating film is formed from a cationic electrodeposition paint.

19. The coated motor core of claim 14, wherein the electrodeposited coating film is formed from an anionic electrodeposition paint.

20. The coated motor core of claim 14, wherein the first and the second spray-coated insulating films are substantially free of at least one of lead, tin and silicon.

21. A motor core coated with a multi-layer insulating film, the insulating film comprising:
   (a) an electrodeposited coating film applied upon an outer surface of the motor core, the electrodeposited coating film formed from an anionic or a cationic electrodeposition paint and having a mean thickness of between about 10 and 25 μm;
   (b) a first spray-coated insulating film applied upon an outer surface of the electrodeposited coating film, the first spray-coated insulating film formed from an epoxy paint and having a mean thickness of between about 20 and 35 μm and a pencil hardness of between 2H and 4H; and
   (c) a second spray-coated insulating film applied upon an outer surface of the first spray-coated insulating film, the second spray-coated insulating film formed from a paint having a denatured silicate resin obtained by reacting a silicate resin with silicic acid and having a mean thickness of between about 5 and 15 μm and a pencil hardness of between 3H and 6H.

22. The coated motor core of claim 21, wherein the core includes a plurality of laminated metal plates.

23. The coated motor core of claim 21, wherein the first and the second spray-coated insulating films are substantially free of at least one of lead, tin and silicon.

* * * * *